US008139596B2

United States Patent
Gale et al.

(10) Patent No.: US 8,139,596 B2
(45) Date of Patent: Mar. 20, 2012

(54) COMMUNICATING PRIORITIZED MESSAGES TO A DESTINATION QUEUE FROM MULTIPLE SOURCE QUEUES USING SOURCE-QUEUE-SPECIFIC PRIORITY VALUES

(75) Inventors: Martin J. Gale, Eastleigh (GB); David Locke, Chandlers Ford (GB)

(73) Assignee: International Business Machines Corporation, Armonk, NY (US)

(*) Notice: Subject to any disclaimer, the term of this patent is extended or adjusted under 35 U.S.C. 154(b) by 360 days.

(21) Appl. No.: 12/139,588

(22) Filed: Jun. 16, 2008

(65) Prior Publication Data

US 2008/0310439 A1    Dec. 18, 2008

(30) Foreign Application Priority Data

Jun. 15, 2007  (EP) ..................................... 07110359

(51) Int. Cl.
*H04L 12/28* (2006.01)
(52) U.S. Cl. ..................... 370/416; 370/230.1; 370/414; 370/418; 709/204; 709/205; 709/206; 709/207; 709/240
(58) Field of Classification Search .................. None
See application file for complete search history.

(56) References Cited

U.S. PATENT DOCUMENTS

| | | | |
|---|---|---|---|
| 6,704,321 B1 * | 3/2004 | Kamiya ........................ 370/412 |
| 6,999,453 B1 * | 2/2006 | Chemla et al. ................ 370/389 |
| 7,039,671 B2 * | 5/2006 | Cullen ........................... 709/201 |
| 7,287,061 B2 * | 10/2007 | Tsubota ......................... 709/207 |
| 2002/0031090 A1 * | 3/2002 | Kadambi et al. ........... 370/235.1 |

* cited by examiner

*Primary Examiner* — Jason Mattis
*Assistant Examiner* — Aixa A Guadalupe
(74) *Attorney, Agent, or Firm* — Patents on Demand P.A.; Brian K. Buchheit; Scott M. Garrett

(57) ABSTRACT

There is disclosed a method, apparatus and computer program for communicating messages between a first messaging system and a second messaging system. The messaging system comprises a set of source queues with each source queue owning messages retrievable in priority order. It is determined that a message should be transferred from the first messaging system to the second messaging system. A source queue is selected which contains a message having at least an equal highest priority when compared with messages on the source queues. A message having the at least equal highest priority from the selected source queue of the first messaging system is then transferred to a target queue at the second messaging system.

20 Claims, 3 Drawing Sheets

COMMUNICATING PRIORITIZED MESSAGES TO A DESTINATION QUEUE FROM MULTIPLE SOURCE QUEUES USING SOURCE-QUEUE-SPECIFIC PRIORITY VALUES

CROSS-REFERENCE TO RELATED APPLICATIONS

This application claims the benefit of European Patent Application No. 07110359.2, filed 15 Jun. 2007, which is hereby incorporated by reference.

BACKGROUND OF THE INVENTION

The present invention relates to communication between a local messaging system and a remote messaging system. More specifically, the invention utilizes a source-queue-specific priority values stored in a priority table of a bridge to determine a priority for delivering queued messages.

Asynchronous transfer of messages between application programs running on different data processing systems within a network is well known in the art. A sender application program issues a command to send (put) a message to a target queue, and a queue manager handles the complexities of transferring the message from the sender to the target queue.

Within a messaging network, messages may be delivered from one data processing system to another via one or more "message brokers" that provide routing and, in many cases, transformations and other services. The brokers are typically located at communication hubs within the network, although broker functions may be implemented at various points within a distributed broker network.

Sometimes it is necessary to connect a local message broker to a remote message broker. It is known to do this via a bridge and to configure the bridge by defining an outbound set of source queues on the local broker and one or more target queue on the remote broker and vice versa to enable the two brokers to communicate messages with one another. A source queue may represent, for example, a subscriber's subscription to a particular topic in a publish/subscribe system.

Such a scenario is illustrated in FIG. 1 (Prior Art). A local message broker 10 comprises a set of source queues 20, 30, 40. Messages are stored on each source queue 20-40 in sub-queues by priority order. Bridge 50 includes a listener 60 which registers a call back with source queues that are of interest to a remote broker 90. Every time a message arrives on a source queue 20-40 for which the listener 60 has registered an interest, that message is sent from the relevant source queue 20-40 to the bridge 50 and is placed by the listener 60 on transmission queue 70. Listener 80 listens on the transmission queue 70 for a new message and moves this across the bridge 50 to a destination queue 95 on remote message broker 90.

In this example, it is assumed that both the local 10 and remote 90 brokers are, under normal conditions, always connected via the bridge 50, so that when a message becomes available for transmission, it is queued for dispatch immediately (i.e., asynchronous message delivery). All messages for transmission to the remote messaging broker 90 are received by the single transmission queue 70.

The benefit of a single transmission queue 70 is that priority and ordering can be honored in one place. However consuming from multiple queues 10-30 creates a conundrum. Across the set of queues 20-40 that the bridge 50 is consuming from there may be many high-priority messages. The bridge 50 must ensure that messages are delivered in priority order and in queued order for each queue 20-40. A couple of known approaches are:

(i) Each source queue is not a real queue but an alias to a transmission queue. All messages sent to the alias queue are put directly onto a single outbound transmission queue.

(ii) Messages from each source queue are consumed and routed to a single outbound transmission queue.

Both approaches have drawbacks including:

1. Additional overhead in storing messages on two queues. This is a drawback of approach (ii) where it is desirable to store messages for a source queue and also the transmission queue.
2. Limitation in maximum queue depth of a single transmission queue.

This is applicable to both approaches above.

3. Difficulty in controlling depth of messages by source queue. This is because with approach (i), messages are not initially stored on a source queue but are routed immediately to a single transmission queue. Thus it is harder to specify and control the depth of messages by source queue.
4. Difficulty in pausing and resuming messages delivery of messages by source queue. This is applicable to approach (i).

A transmission queue can only hold a finite number of messages at any given time. Consider the situation where there are four queues that are consumed from, and one transmission queue. It is perfectly valid that across those four queues there are many more messages then can be contained on a single transmission queue. The bridge than has to consider fairness across all the queues in terms of which queue has its messages put into the transmission queue.

It is also known for a remote client to register a call back with each source queue that it is interested in receiving messages from. When a message arrives on one of those source queues, the priority of that message is examined and a reference to that message is moved into an intermediate data structure (for example, a FIFO structure) with the reference to the message being removed from the source queue. There is an intermediate data structure for each message priority. This means that it is not necessary to lock each structure when performing processing, but only the particular priority structure in question. At transmission point, the highest priority structures are drained first. This solution again relies on intermediate structures which have a finite amount of space.

BRIEF SUMMARY OF THE INVENTION

According to a first aspect, there is provided a method for communicating messages between a first messaging system and a second messaging system, wherein the first messaging system comprises a set of source queues, each source queue owning messages retrievable in priority order. The method can determine that a message should be transferred from the first messaging system to the second messaging system, can select a source queue which contains a message having at least an equal highest priority when compared with messages on the source queues, can transfer a message having the at least equal highest priority from the selected source queue of the first messaging system to a target queue at the second messaging system. An indication can be maintained as to the highest priority of messages held by each source queue. For example, a priority table may be used.

In one embodiment, in order to maintain such an indication it is determined that a message has arrived on a source queue.

The priority of the message newly arrived on the source queue is determined. The priority of the newly arrived message is compared with a stored indication of the current highest priority of the source queue. The indication is updated if the current highest priority is less than the priority of the newly arrived message.

In one embodiment, in order to select a source queue containing a message having at least an equal highest priority when compared with messages on the source queues comprises, the following is done: it is determined that a set of the source queues have messages of equal highest priority when compared with the source queues and one of the set of source queues having messages of equal highest priority is selected.

In one embodiment instead of randomly selecting, weightings applied to the source queues each having a message of equal highest priority are used.

In one embodiment, the indication as to the highest priority of messages held by each source queue is periodically updated.

In one embodiment, in order to maintain an indication as to the highest priority of messages held by each source queue, an indication may be maintained as to the number of messages held by each source queue with this priority.

In this embodiment, more than one message may be transferred from a source queue to the second messaging system.

According to a second aspect, there is provided an apparatus for communicating messages between a first messaging system and a second messaging system, wherein the first messaging system comprises a set of source queues, each source queue owning messages retrievable in priority order. The apparatus can include a means for determining that a message should be transferred from the first messaging system to the second messaging system, a means for selecting a source queue which contains a message having at least an equal highest priority when compared with messages on the source queues, and a means for transferring a message having the at least equal highest priority from the selected source queue of the first messaging system to a target queue at the second messaging system.

According to third aspect, there is provided a computer program comprising program code stored on a storage medium, where the computer program can cause a set of one or more computing devices executing the computer program to perform the method of the first aspect.

BRIEF DESCRIPTION OF THE DRAWINGS

A preferred embodiment of the present invention will now be described, by way of example only, and with reference to the following drawings.

DETAILED DESCRIPTION OF THE INVENTION

Figure 1:
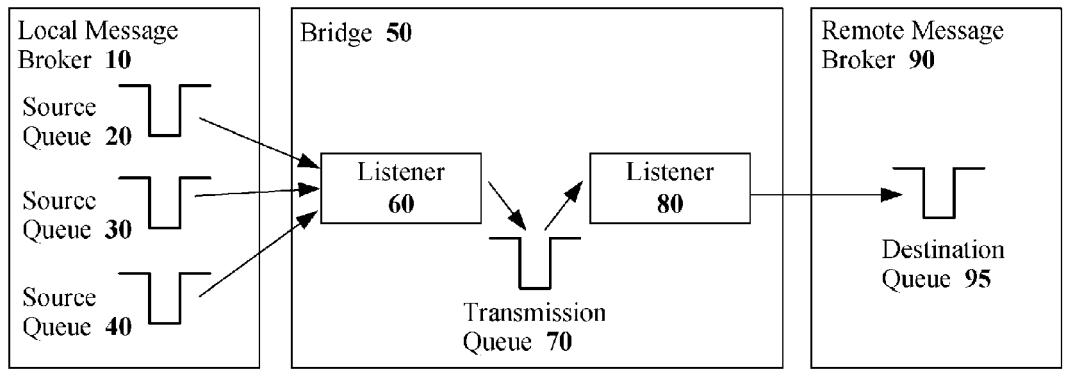
FIG. 1 (Prior Art) illustrates a local message broker communicating, via a bridge, with a remote message broker in accordance with the prior art.

A mechanism is proposed whereby priority is honored when consuming from many source queues, while ensuring fairness across the wider set of source queues.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
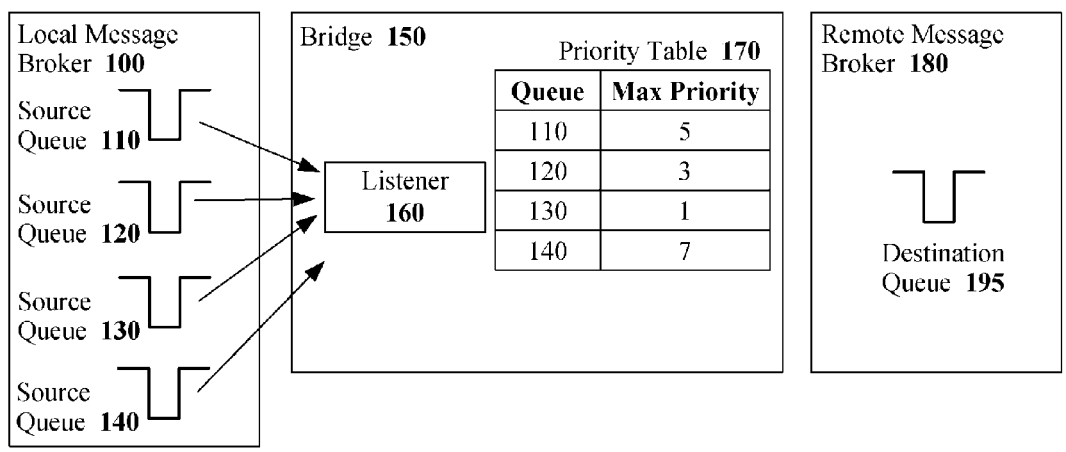
FIG. 2 illustrates a local message broker communicating with a remote message broker in accordance with an embodiment of the inventive arrangements disclosed herein.
Figure 3:
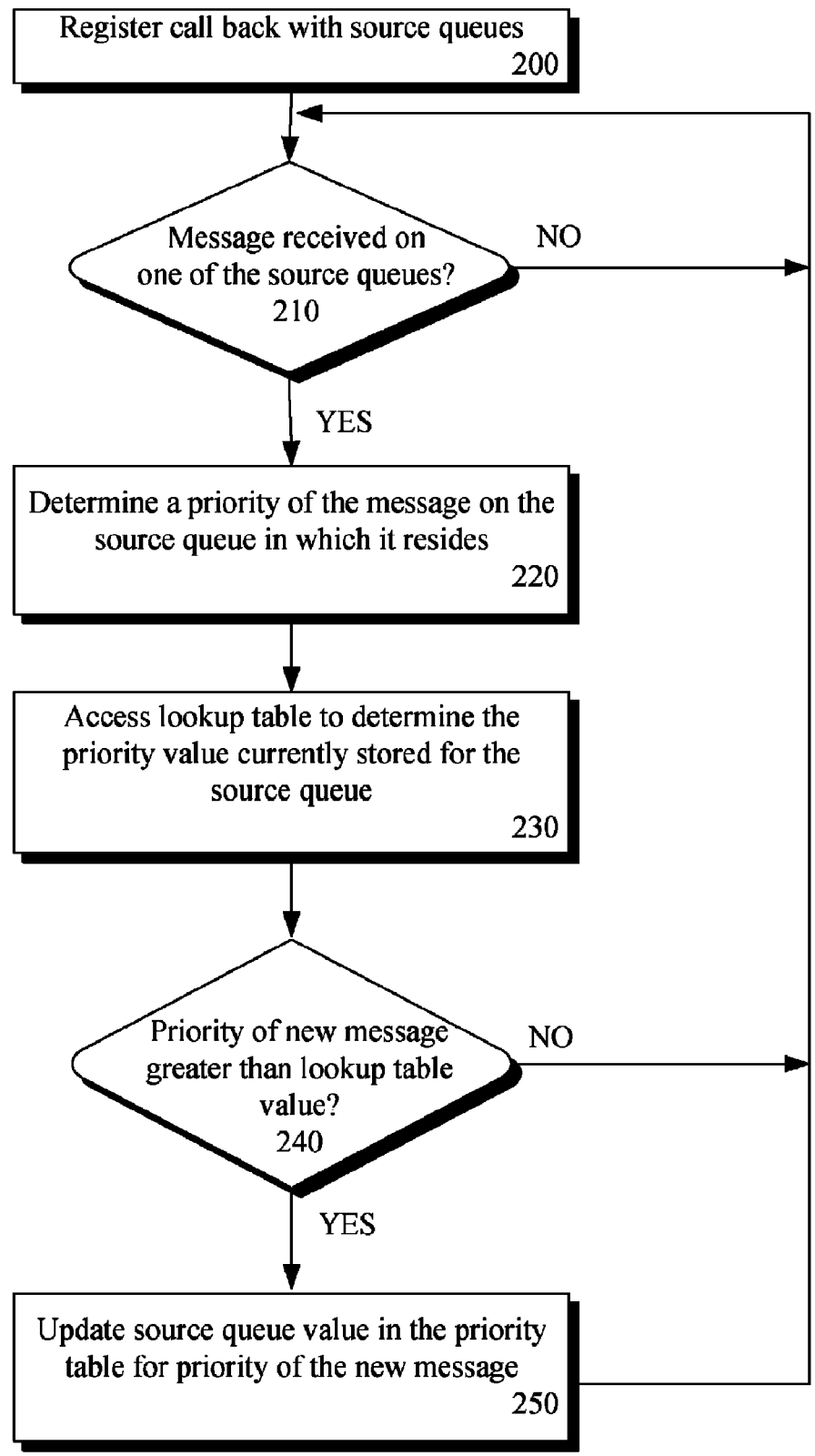
FIG. 3 illustrates a flow chart of a method for communicating messages between different message systems in accordance with an embodiment of the inventive arrangements disclosed herein.
Figure 4:
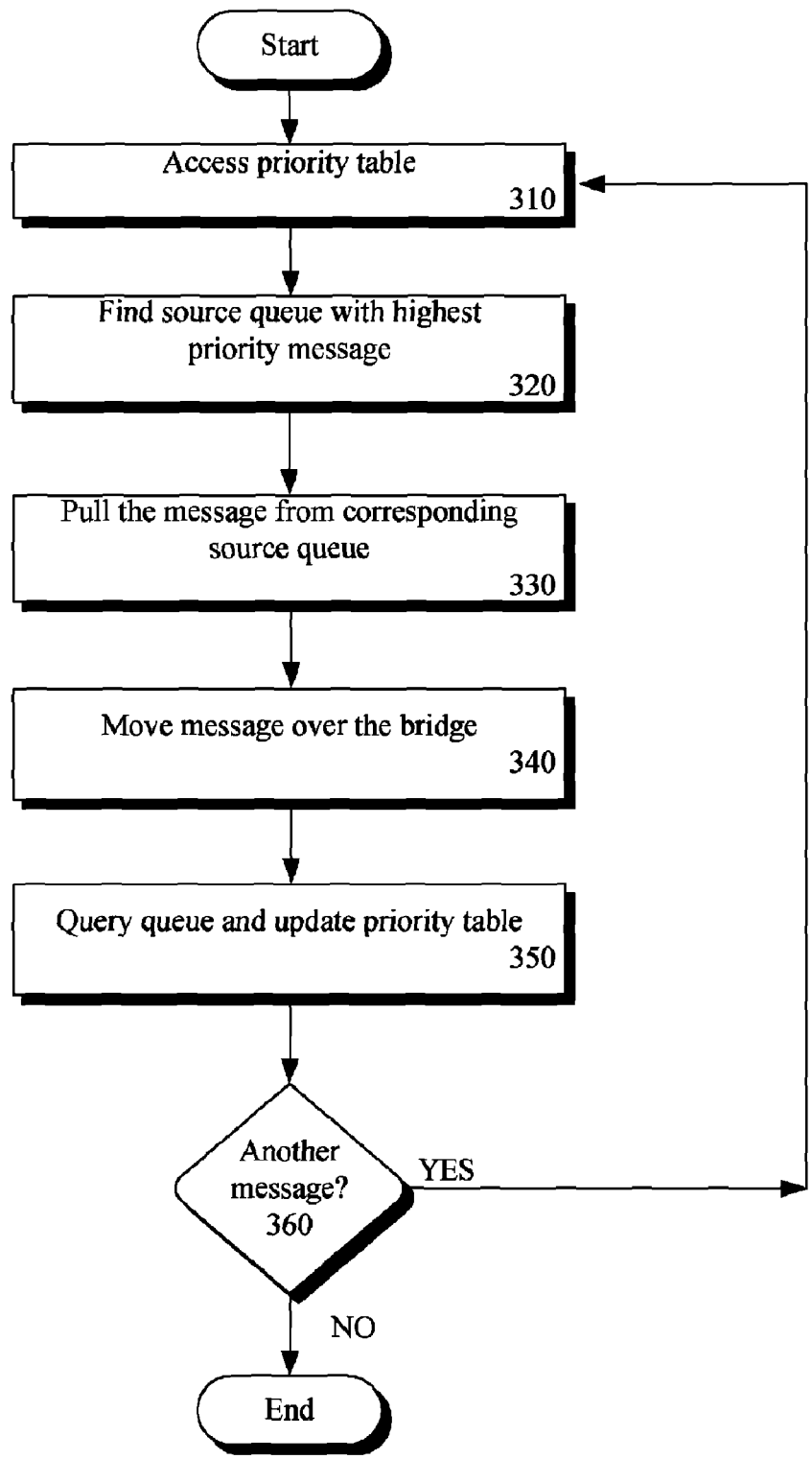
FIG. 4 illustrates another flow chart of a method for communicating messages between different message systems in accordance with an embodiment of the inventive arrangements disclosed herein.

The components of an embodiment of the present invention is illustrated with respect to FIG. 2. The processing of an embodiment is shown in FIGS. 3 and 4. All the figures should be read in conjunction with one another.

Local message broker 100 contains a set of source queues 110, 120, 130 and 140. Each source queue 110-140 contains messages which can be retrieved in priority order. This may be implemented using a set of sub-queues (one for each priority within a queue). Bridge 150 is used to move messages from these queues 110-140 to a destination queue 195 on remote message broker 180. When the bridge 150 connects to the local message broker 100, the bridge 150 registers (via listener 160) a call back with each source queue 110-140 that the remote message broker 180 has specified an interest in (step 200). Note, one listener 160 is shown but this is by way of example only. There may be multiple listeners, such as having one for each source queue 110-140.

Every time a message becomes available on a specified source queue 110-140 for delivery to the remote broker 180, the listener 160 is notified by a callback. Note that, in the preferred embodiment, this callback preferably does not contain the message itself, merely the queue name/identifier of the queue containing the message. The callback is in fact merely a hint/notification to an interested party that there is something queued. (In alternative embodiments, the callback may contain the entire message or the priority of the message.)

Thus, at step 210 the listener is waiting for a new message to be received on a relevant source queue.

The bridge 150 maintains a lookup (priority) table 170 to map a queue name with the priority of the highest priority message currently queued on the given queue 110-140. On receipt of the callback, the listener 160 queries the appropriate queue to determine the priority of the current newest message on that queue at step 220. The listener 160 then accesses the lookup table to determine the priority value currently stored for the specific queue (step 230). It is determined at step 240 whether the priority of the message just received on the queue is higher than the entry for the same queue in the lookup table 170. If it is, then the entry in the priority table 170 is updated at step 250. Otherwise, the process loops round.

In another embodiment, rather than the listener 160 having to specifically query the queue for the priority of the message, that information may be presented to the listener 160 when it is informed of a new message.

Transmission of messages across the bridge 150 may occur periodically. It should be appreciated that the two brokers 110 and 180 may not be permanently connected to the bridge 150.

When transmission is triggered for the bridge 150, the table 170 is queried by the listener 160 to determine the queue or queues that have the highest priority messages waiting (step 310, 320). For the purpose of FIG. 4, it will be assumed that only one queue has a single highest priority message on it. That message is then removed from the source queue (step 330) and is moved by the listener 160 over the bridge 150 to the remote broker 180 (step 350). Note the bridge 150 has a mapping definition (not illustrated) defining where messages from a particular source queue are to be targeted.

At step 350, the source queue from which a message has been removed is queried to determine the highest priority message that that queue now holds and this information is used to update the priority table 170 as appropriate. It should be appreciated that a queue may contain multiple messages of the same priority and that if the highest priority is X, then more than one queue may hold messages of X priority.

It is then determined at step 360 whether there is another message to transmit from any of the source queues 110-140. If there is, the process loops round, otherwise the process ends. It should be appreciated that when a new notification of a new message on one of the source queues is received, if the transmission process of FIG. 4 is not running, then this process will be triggered.

In one embodiment, there are no more messages when source queue entry in the priority table has a value of −1. As previously discussed, when a message is removed from a queue, that source queue is queried to determine the highest priority message that it holds. If a queue does not hold any messages, then the bridge 150 (the listener 160) is informed of this and the table 170 is updated to indicate a value of −1.

If there is more than one queue with the highest priority messages, fairness may be ensured by picking a queue at random. In this way, it should not be possible for one queue to be drained before another is given any processing time.

In another embodiment, each queue can be assigned a weighting that determines the sequence that should be used.

In one embodiment, once a message is moved across the bridge 150, the priority table 170 is updated and it is thus at least probably that the next message selected will be from a different source queue.

In another embodiment, if a first queue is determined to have messages of priority five (and no messages on that queue of a higher priority), an indication could further be stored for that queue as to the number of messages on the queue with a priority of five. An appropriate algorithm may then be used to determine how many messages with the highest priority should be consecutively drained from a particular queue.

While time order across queues may differ, priority and time order within priority of source queue may be maintained and does not require additional processing overhead that would be associated with synchronizing many time stamps. The next message is thus removed from the queue and dispatched for delivery by the bridge. Having moved the message across the bridge 150, the lookup table is refreshed and the dispatch loop continues as appropriate and according to the required transmission control semantics.

Note that the processing of FIGS. 3 and 4 can be performed by different threads. The thread doing the updating of the priority table 170 can lock the table 170 when an update is being performed. In this way, it is not possible for data conflicts to occur.

The invention has been described in terms of a local message broker 110 communicating with a remote message broker 180. This is by way of example only. It will be clear to one of ordinary skill in the art that the invention is relevant to the communication of any messaging system with another messaging system.

It should be appreciated that the present invention has been described in terms of a local messaging system sending messages to a remote messaging system. The invention is also intended to encompass the reverse.

According to one embodiment, if a message cannot be delivered, it will stay on its source queue, regardless of priority. This may mean that no more messages from any of the source queues are able to be transmitted via the bridge 150 until a problem with the message is resolved. In another embodiment, the problematic source queue may be disregarded until the problem is resolved. The bridge 150 may therefore continue moving messages from the other source queues.

It should be appreciated that upon system start-up, the priority table 170 can be populated based on the highest priority messages stored on each source queue. Thereafter, the table 170 is maintained as discussed above.

It should be appreciated that it is not essential to the invention that messages are stored by time order within priority.

What is claimed is:

1. A method for communicating messages between a first messaging system and a second messaging system, wherein the first messaging system comprises a plurality of source queues, each source queue owning messages retrievable in priority order, each message having a priority independent of its position in the queue, the method comprising:

determining that a message should be transferred from the first messaging system to the second messaging system by a bridge operatively coupled between the first and second messaging systems based on a registration by the second messaging system with the bridge;

selecting a source queue from the plurality of source queues which contains a message having at least an equal highest priority when compared with other messages on the plurality of source queues, which comprises:

determining that a plurality of the source queues have messages of equal highest priority when compared with the source queues; and selecting one of the plurality of source queues having a message of equal highest priority based on the weightings applied to these queues; and selecting a message in the selected source queue having at least an equal highest priority, wherein selecting the source queue and selecting the message are performed by the bridge; and transferring the selected message from the selected source queue of the first messaging system to a target queue at the second messaging system via the bridge.

2. The method of claim 1, further comprising: maintaining, at the bridge, an indication for each of the source queues as to the highest priority of messages held in each source queue.

3. The method of claim 2, wherein the step of maintaining an indication comprises:

determining that a message has arrived on a source queue;

determining the priority of the message newly arrived on the source queue;

comparing the priority of the newly arrived message with a stored indication of the current highest priority of the source queue; and updating the indication if the current highest priority is less than the priority of the newly arrived message.

4. The method of claim 2, further comprising: periodically updating the indication as to the highest priority of messages held by each source queue.

5. The method of claim 2, wherein the step of maintaining an indication as to the highest priority of messages held by each source queue comprises further maintaining an indication of the number of messages held by each source queue with this priority.

6. The method of claim 5 comprising: consecutively transferring more than one message from a source queue to the second messaging system.

7. The method of claim 1, wherein the step of selecting one of the plurality of source queues having a message of equal highest priority comprises:

randomly selecting the one of the plurality of source queues having messages of equal highest priority.

8. Apparatus comprising hardware and software for communicating messages between a first messaging system and a second messaging system, wherein the first messaging system comprises a plurality of source queues, each source queue owning messages retrievable in priority order, wherein the priority order is not determined by message position in a queue, the apparatus comprising:

a determining component, comprising computer program instructions stored on at least one non-transitory storage medium, said computer program instructions able to be executed by at least one processor, wherein said determining component is operable for determining that a message should be transferred from the first messaging system to the second messaging system based on a registration of the second messaging system with the apparatus, the registration indicating the plurality of sources queues as being of interest to the second messaging system;

a selecting component, comprising computer program instructions stored on at least one non-transitory storage medium, said computer program instructions able to be executed by at least one processor, wherein said selecting component is operable for selecting a source queue which contains a message having at least an equal highest priority when compared with messages on the source queues, wherein the selecting component comprises:

a determining component for determining that a plurality of the source queues have a messages of equal highest priority when compared with the source queues, and wherein said selecting component is further operable for selecting one of the plurality of source queues having a message of equal highest priority based on weightings applied to these queues; and a transferring component, comprising computer program instructions stored on at least one non-transitory storage medium, said computer program instructions able to be executed by at least one processor, wherein said transferring component is operable for transferring a message having the at least equal highest priority from the selected source queue of the first messaging system to a target queue at the second messaging system via the apparatus.

9. The apparatus of claim 8 comprising:
a priority table in the apparatus for maintaining an indication of the priority of a message in each source queue having the highest priority of messages held in each source queue.

10. The apparatus of claim 9, wherein a maintaining component for maintaining an indication comprises:
a determining component for determining that a message has arrived on a source queue;
a determining component for determining the priority of the message newly arrived on the source queue;
a comparing component, comprising computer program instructions stored on at least one non-transitory storage medium, said computer program instructions able to be executed by at least one processor, wherein said comparing component is operable for comparing the priority of the newly arrived message with a stored indication of the current highest priority of the source queue; and
an updating component, comprising computer program instructions stored on at least one non-transitory storage medium, said computer program instructions able to be executed by at least one processor, wherein said updating component is operable for updating the indication if the current highest priority is less than the priority of the newly arrived message.

11. The apparatus of any of claims 9, comprising:
an updating component for periodically updating the indication as to the highest priority of messages held by each source queue.

12. The apparatus of claim 9, wherein the priority table further maintains an indication of the number of messages held by each source queue with this priority.

13. The apparatus of claim 12 comprising:
a transferring component, comprising computer program instructions stored on at least one non-transitory storage medium, said computer program instructions able to be executed by at least one processor, wherein said transferring component is operable for consecutively transferring more than one message from a source queue to the second messaging system.

14. The apparatus of claim 8, wherein the selecting component is further operable for
randomly selecting the one of the plurality of source queues having messages of equal highest priority.

15. A method for communicating messages between a first messaging system and a second messaging system, wherein the first messaging system comprises a plurality of source queues, each source queue owning messages retrievable in priority order, each message having a priority independent of its position in the queue, the method comprising:
determining that a message should be transferred from the first messaging system to the second messaging system by a bridge operatively coupled between the first and second messaging systems based on a registration by the second messaging system with the bridge; selecting a source queue from the plurality of source queues which contains a message having at least an equal highest priority when compared with other messages on the plurality of source queues, which comprises:
determining that a plurality of the source queues have messages of equal highest priority when compared with the source queues; and
randomly selecting one of the plurality of source queues having messages of equal highest priority; and
selecting a message in the selected source queue having at least an equal highest priority, wherein selecting the source queue and selecting the message are performed by the bridge; and
transferring the selected message from the selected source queue of the first messaging system to a target queue at the second messaging system via the bridge.

16. The method of claim 15, wherein the step of maintaining an indication comprises:
determining that a message has arrived on a source queue;
determining the priority of the message newly arrived on the source queue;
comparing the priority of the newly arrived message with a stored indication of the current highest priority of the source queue; and
updating the indication if the current highest priority is less than the priority of the newly arrived message.

17. The method of claim 16, further comprising: periodically updating the indication as to the highest priority of messages held by each source queue.

18. The method of claim 16, further comprising:
periodically updating the indication as to the highest priority of messages held by each source queue.

19. The method of claim 16, wherein the step of maintaining an indication as to the highest priority of messages held by each source queue comprises further maintaining an indication of the number of messages held by each source queue with this priority.

20. The method of claim 15, wherein the randomly selecting one of the plurality of source queues having a message of equal highest priority is based on the weightings applied to these queues.

* * * * *